US 8,724,741 B2

(12) United States Patent
Bottomley et al.

(10) Patent No.: US 8,724,741 B2
(45) Date of Patent: May 13, 2014

(54) SIGNAL QUALITY ESTIMATION FROM COUPLING MATRIX

(75) Inventors: Gregory E. Bottomley, Cary, NC (US); Yi-Pin Eric Wang, Fremont, CA (US)

(73) Assignee: Telefonaktiebolaget L M Ericsson (Publ), Stockhom (SE)

( * ) Notice: Subject to any disclaimer, the term of this patent is extended or adjusted under 35 U.S.C. 154(b) by 1117 days.

(21) Appl. No.: 12/572,680

(22) Filed: Oct. 2, 2009

(65) Prior Publication Data

US 2011/0080982 A1 Apr. 7, 2011

(51) Int. Cl.
*H04L 27/00* (2006.01)
*H04L 27/06* (2006.01)
*H03D 1/06* (2006.01)

(52) U.S. Cl.
USPC ............ 375/316; 375/324; 375/340; 375/346

(58) Field of Classification Search
USPC ......... 375/130, 134, 136, 137, 142, 143, 144, 375/147, 148, 149, 152, 211, 219, 220, 295, 375/316, 346, 348, 222, 221, 375/240.26–240.27, 285, 296, 340
See application file for complete search history.

(56) References Cited

U.S. PATENT DOCUMENTS

| | | | |
|---|---|---|---|
| 8,126,043 B2 | 2/2012 | Bottomley et al. | |
| 8,295,417 B2 | 10/2012 | Cairns et al. | |
| 2004/0264591 A1* | 12/2004 | Malm et al. | 375/261 |
| 2005/0281358 A1 | 12/2005 | Bottomley et al. | |
| 2006/0251156 A1* | 11/2006 | Grant et al. | 375/148 |
| 2007/0133814 A1* | 6/2007 | Wu et al. | 381/71.1 |
| 2008/0192816 A1* | 8/2008 | Momtaz | 375/233 |
| 2009/0011771 A1* | 1/2009 | Takahashi et al. | 455/452.2 |
| 2011/0026566 A1* | 2/2011 | Grant | 375/144 |

FOREIGN PATENT DOCUMENTS

| | | |
|---|---|---|
| WO | WO 2005/004430 A1 | 1/2005 |
| WO | WO 2006/132593 A2 | 12/2006 |
| WO | WO 2007/145556 A1 | 12/2007 |

OTHER PUBLICATIONS

Narasimhan R., "Spatial Multiplexing With Transmit Antenna And Constellation Selection For Correlated Mimo Fading Channels", IEEE Transactions On Signal Processing, IEEE Service Center, New York, NY, US, vol. 51, No. 11, Nov. 1, 2003.
Salo J. et al.: "Some Results On MIMO Mutual Information: The High SNR Case", Global Telecommunications Conference, 2004. Globecom '04. IEEE Dallas, IX, USA Nov. 29-Dec. 3, 2004, Piscataway, NJ, USA,IEEE, vol. 2, Nov. 29, 2004.
Grant S.J. et al., "Generalized RAKE receivers for MIMO systems," in Proc. IEEE Vehicular Technology Conf. (VTC 2003-Fall), Orlando, Oct. 6-9, 2003, the whole document.
Doucet A. et al., "Monte Carlo Methods for Signal Processing [A review in the statistical signal processing context]," IEEE Sig. Proc. Mag., Nov. 2005, the whole document.
Translation of the Office Action for the Chinese patent application No. 201080045661.6 dated Nov. 19, 2013, the whole document.

* cited by examiner

Primary Examiner — Sam K Ahn
Assistant Examiner — Linda Wong

(57) ABSTRACT

The quality of a received signal in a non-linear receiver is estimated using a coupling matrix G or Q that describes the interaction of symbols in the received signal with other symbols and/or how the impairment (noise and interference) interacts in the received signal. The coupling matrix is also useful for joint detection. The signal quality estimate may include, e.g., the minimum eigenvalue, and other functions, such as the determinant and trace of the coupling matrix. When G or Q varies with each block, as in CDMA systems employing longcode scrambling, a representative matrix can be used, such as a matrix of RMS values or average magnitudes of real and imaginary components. The signal quality estimate can be expressed as a bit error rate (BER).

12 Claims, 6 Drawing Sheets

US 8,724,741 B2

SIGNAL QUALITY ESTIMATION FROM COUPLING MATRIX

TECHNICAL FIELD

The present invention relates generally to wireless communication networks, and in particular to a method and apparatus to estimate received signal quality from a coupling matrix in a non-linear receiver.

BACKGROUND

Many system tasks in modern wireless communication networks, such as power control, rate adaptation, link monitoring, and the like, depend on estimates of signal quality. Generally, a receiver generates a signal-to-interference-plus-noise ratio (SINR) as a metric of signal quality, and reports the SINR to the network. Linear receivers can estimate SINR using closed-form theoretical expressions, substituting parameter estimates for actual values. This approach is disclosed in co-pending U.S. patent application Ser. No. 10/869,456, titled "SIR Estimation in a Wireless Receiver," by Gregory E. Bottomley, filed Jun. 16, 2004, assigned to the assignee of the present application, and incorporated by reference herein in its entirety.

However, this approach does not work with more advanced, non-linear receivers. For example, High Speed Packet Access (HSPA) in wideband CDMA (WCDMA) utilizes block equalization with joint detection of symbols transmitted in parallel (also known in the art as multicode transmission). See co-pending U.S. patent application Ser. No. 12/035,846, titled "Method and Apparatus for Block-Based Signal Demodulation," by G. Bottomley and Y-P. E. Wang, filed Feb. 22, 2008, assigned to the assignee of the present application, and incorporated by reference herein in its entirety.

For both HSPA and the Long Term Evolution (LTE) enhancements to the Universal Mobile Telecommunications System (UMTS), Multiple-Input, Multiple-Output (MIMO) technology is used. MIMO is communications technology in which multiple transmit antennas are utilized at a transmitter, and also possibly multiple receive antennas at a receiver. MIMO technology offers increased data throughput and range, without requiring additional bandwidth or transmit power. It achieves this by higher spectral efficiency and link diversity. MIMO transmission involves sending multiple, overlapping streams of data. Joint detection is one approach for recovering symbols received simultaneously, as described in the paper by S. J. Grant, K. J. Molnar, and G. E. Bottomley titled "Generalized RAKE receivers for MIMO systems," published in Proc. IEEE Vehicular Technology Conf. (VTC 2003-Fall), Orlando, Oct. 6-9, 2003, incorporated by reference herein in its entirety. Additionally, joint detection of co-channel signals can be used in both HSPA and LTE when transmissions overlap.

For non-linear receivers employing joint detection, there is no simple, closed-form expression for demodulation output SINR. Hence, estimating signal quality by such receivers, for use in performing essential network optimization tasks, is problematic.

SUMMARY

According to one or more embodiments described and claimed herein, the quality of a received signal in a non-linear receiver is estimated using a coupling matrix G or Q that describes the interaction of symbols in the received signal with other symbols and/or how the impairment (noise and interference) interacts in the received signal. The coupling matrix is also useful for joint detection. The signal quality estimate may include, e.g., the minimum eigenvalue, and other functions, such as the determinant and trace of the coupling matrix. When G or Q varies with each block, as in CDMA systems employing longcode scrambling, a representative matrix can be used, such as a matrix of RMS values or average magnitudes of real and imaginary components. The signal quality estimate can be expressed as a bit error rate (BER) or effective SINR for a linear receiver.

DETAILED DESCRIPTION

Figure 1:
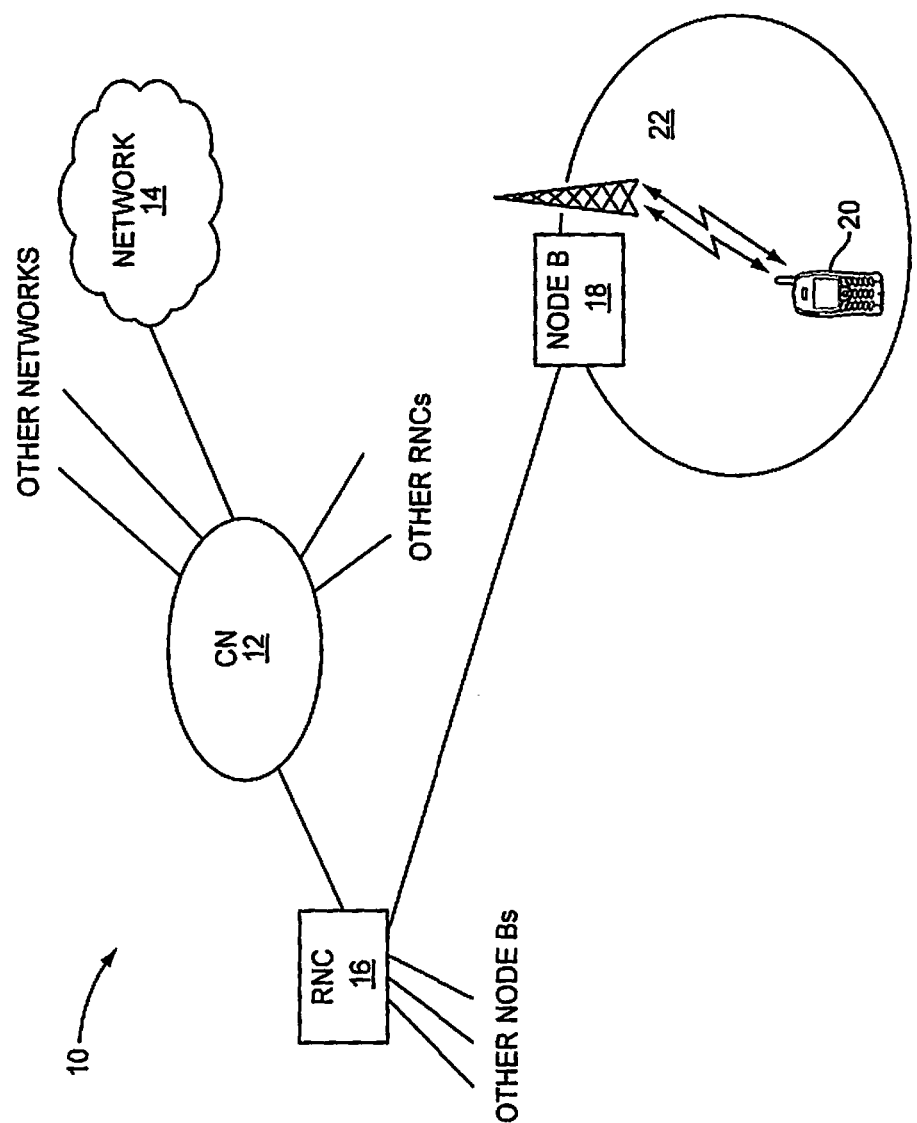
FIG. 1 is a functional block diagram of a wireless communication network.

FIG. 1 depicts a representative wireless communication network 10. Although described herein in the context of LTE extensions to UMTS, the network 10 may operate according to any protocol in which non-linear receivers are utilized. In other networks, the network 10 elements depicted in FIG. 1 may be organized or denominated differently than those shown. However, those of skill in the art will readily discern the application of the present invention to other networks, given the teachings of the present disclosure in the LTE context.

The wireless communication network 10 includes a Core Network (CN) 12, communicatively connected to one or more other networks 14, such as the Public Switched Telephone Network (PSTN), the Internet, or the like. Communicatively connected to the CN 12 are one or more Radio Network Controllers (RNC) 16, which in turn control one or more NodeB or enhanced NodeB (eNodeB) stations 18. The NodeB 18, also known as a base station, includes radio frequency (RF) equipment and antennas necessary to effect wireless radio communications with one or more user equipment (UE) 20 within a geographic region, or cell 22. As depicted, the NodeB 18 and UE 20 may communicate via two or more data streams simultaneously, utilizing MIMO technology, multicast, or the like.

With joint detection, transmitted symbols are jointly detected at a receiver by forming metrics that depend on a coupling matrix G or Q. This matrix indicates how the symbols interact with each other in the received signal and/or how the impairment (noise and interference) interacts in the received signal. According to embodiments of the invention described herein, a signal quality estimate is derived from the coupling matrix. Such a signal quality estimate may include, e.g., the minimum eigenvalue, and other functions, such as the determinant and trace. When G or Q varies with each block, as in CDMA systems employing longcode scrambling, a representative matrix can be used, such as a matrix of root-mean-square (RMS) values or average magnitudes of real and imaginary components.

Figure 2:
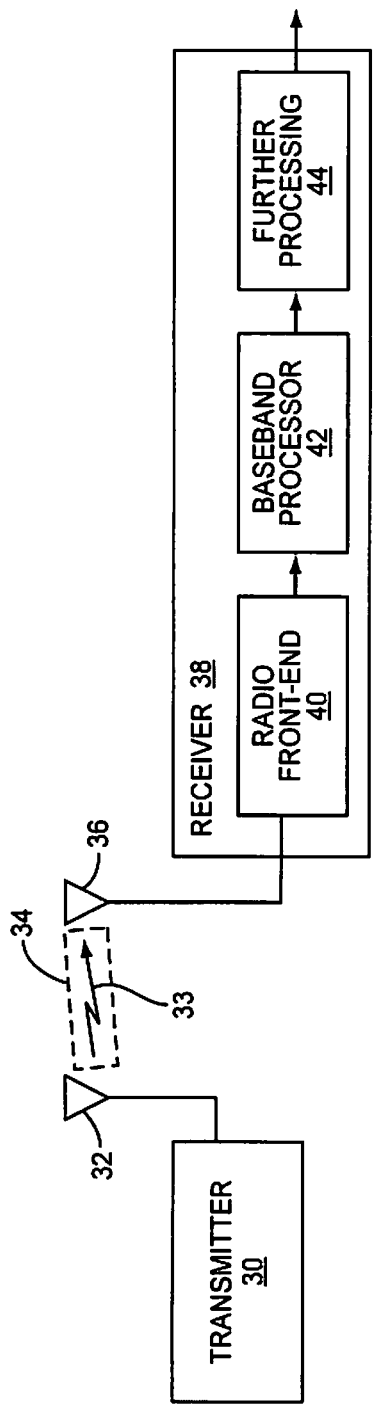
FIG. 2 is a functional block diagram of a transmitter and receiver operative in the wireless communication network of FIG. 1.

FIG. 2 depicts an exemplary system functional block diagram, including a transmitter 30 and receiver 38. Those of skill in the art will readily recognize that the transmitter 30 may be embodied in a NodeB or eNodeB 18 and the receiver 36 in a UE 20 for downlink transmissions, or vice versa for uplink transmissions. In either case, the transmitter 30 encodes, modulates, and amplifies signals 33, and transmits the signals 33 in multiple, overlapping streams by one or more antennas 32. The transmitted signals 33 pass through a transmission medium 34, such as a multipath fading channel, and are received at one or more receive antennas 36 at a receiver 38.

The signals 33, which may comprise MIMO signals, and may include numerous multipath components, are processed by a front-end RF receiver circuit 40 operative to amplify, filter, digitize, and down-convert the signals to baseband. The resultant baseband signal is provided to a baseband processor 42, which recovers hard or soft information corresponding to symbols in the received signal. The baseband processor 42 outputs recovered symbols for further processing by circuits 44, such as Forward Error Correction (FEC) decoding and the like.

Figure 3:
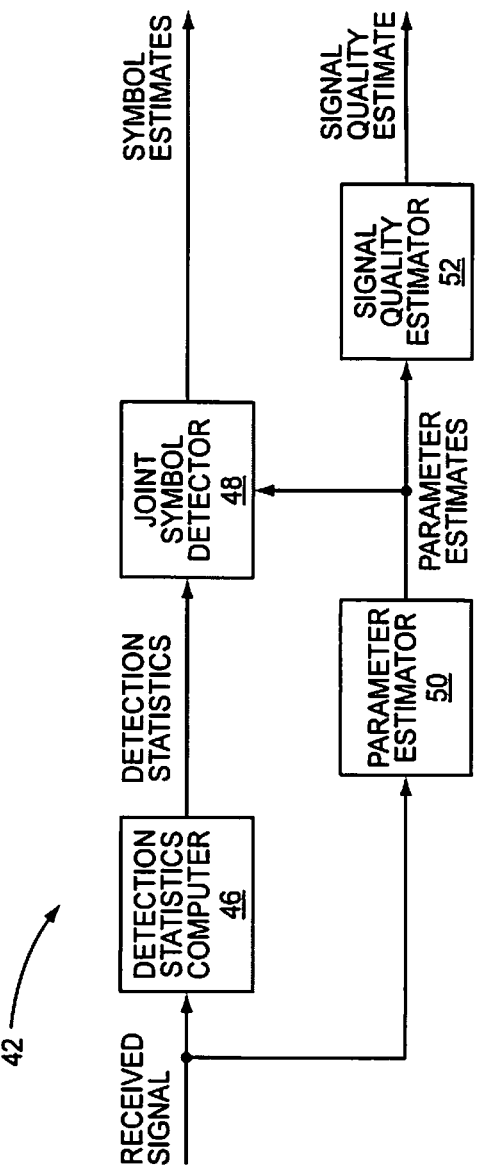
FIG. 3 is a functional block diagram of circuit modules in the baseband processor of the receiver of FIG. 2.

FIG. 3 depicts one embodiment of the baseband processor 42. The processor 42 includes a detection statistics computer 46, a joint symbol detector 48, a parameter estimator 50, and a signal quality estimator 52. The detection statistics computer 46 is configured to generate detection statistics for the symbols in a received signal. For example, matched filter or rake outputs can be generated. The detection statistics can be represented as a vector z, which can be modeled as:

$$z = Hs + u \quad (1)$$

where H is a response matrix, s is a vector of the K symbols of interest, and u is an impairment with covariance R. Note that R can be viewed as coupling matrix for the impairment. For OFDM systems, the response matrix H depends on channel estimates. For CDM or COMA systems, H may also depend on scrambled spreading sequences. Approaches for estimating R are well known. For example, see the above-cited U.S. patent application Ser. No. 12/035,846.

The joint symbol detector 48 is configured to jointly detect the K symbols by hypothesizing different symbol combinations and selecting the combination that optimizes a metric. A typical joint detection metric to maximize has the form:

$$M(a) = -(z - Ha)^H R^{-1}(z - Ha) \quad (2)$$

where a is a vector of hypothesized symbol values and superscript H denotes Hermitian transpose. Expanding this metric and dropping terms unrelated to a gives the equivalent metric:

$$M(a) = 2Re\{a^H y\} - a^H G a \quad (3)$$

where $$y = H^H R^{-1} z \text{ and} \quad (4a)$$

$$G = H^H R^{-1} H. \quad (4b)$$

If G is scaled properly, it corresponds to an SINR matrix $Q = fG$ in that performance can be related to the elements in Q.

A parameter estimator 50 provides parameter estimates derived from the received signal 33. The parameter estimator 50 may, for example, estimate H and R, used by the joint symbol detector 48. Additionally, the parameter estimator 50 may form the coupling matrix G or Q. A signal quality estimator 52 then takes these parameter estimates and forms a signal quality estimate. The signal quality estimate may take the form of an "effective SINR" such that error-rate performance can be inferred. For example, for binary phase shift keying (BPSK) modulation, it is desirable to determine an effective SINR such that a bit error rate (BER) is given by $$BER = 0.5 erfc(\sqrt{SINR}) \quad (5)$$

where erfc is the complimentary error function.

It is known in the art that performance is related to the eigenvalues of Q. See, e.g., S. Verdú, *Multiuser Detection*, Cambridge University Press, 1998, section 4.3.2, pp. 186-195, the disclosure of which is incorporated herein in its entirety. For example, the minimum distance for error events is related to the minimum eigenvalue of Q. At high SINR, where joint detection may be used, performance is dominated by the minimum distance. Thus, in one embodiment, the SINR is estimated using the minimum eigenvalue of Q. Mathematically, $$SINR_{est} = \lambda_{min}(Q) \quad (6a)$$

The minimum eigenvalue can be determined using standard approaches for eigenvalue estimation. These approaches typically estimate the largest eigenvalue, then the second, and so forth. In one embodiment, Q is first inverted, the largest eigenvalue is estimated, and then its reciprocal is taken.

Equivalently, the minimum eigenvalue of G may be used, with scaling applied after the fact, giving $$SINR_{est} = f \lambda_{min}(G) \quad (6B)$$

Note that the coupling matrix can be shared by both the joint symbol detector 48 and the signal quality estimator 52.

If joint detection is being performed in addition to signal quality estimation, then the received signal is processed by the detection statistics computer 46 to form detection statistics. Processing may involve linear filtering, such as despreading and possibly Rake combining in a CDMA receiver. In an OFDM receiver, it may involve performing an FFT. This yields statistics such as z in equation (1) or y in equation (4a). These statistics are used in the joint symbol detector 48 to form metrics, such as the metrics in equations (2) or (3), for determining symbol estimates. Symbol estimates can be in the form of hard symbol or bit decisions, as well as soft information, such as symbol likelihoods or bit log-likelihood ratios.

Metric formation also uses parameter estimates provided by the parameter estimator 50. For the metric in equation (2), estimates of H and R would be provided. For the metric in equation (3), the parameter estimator 50 may provide either H and R separately, or G given in equation (4b). These parameter estimates are also used by signal quality estimator 52 to form a signal quality estimate, such as SINR.

Figure 4:
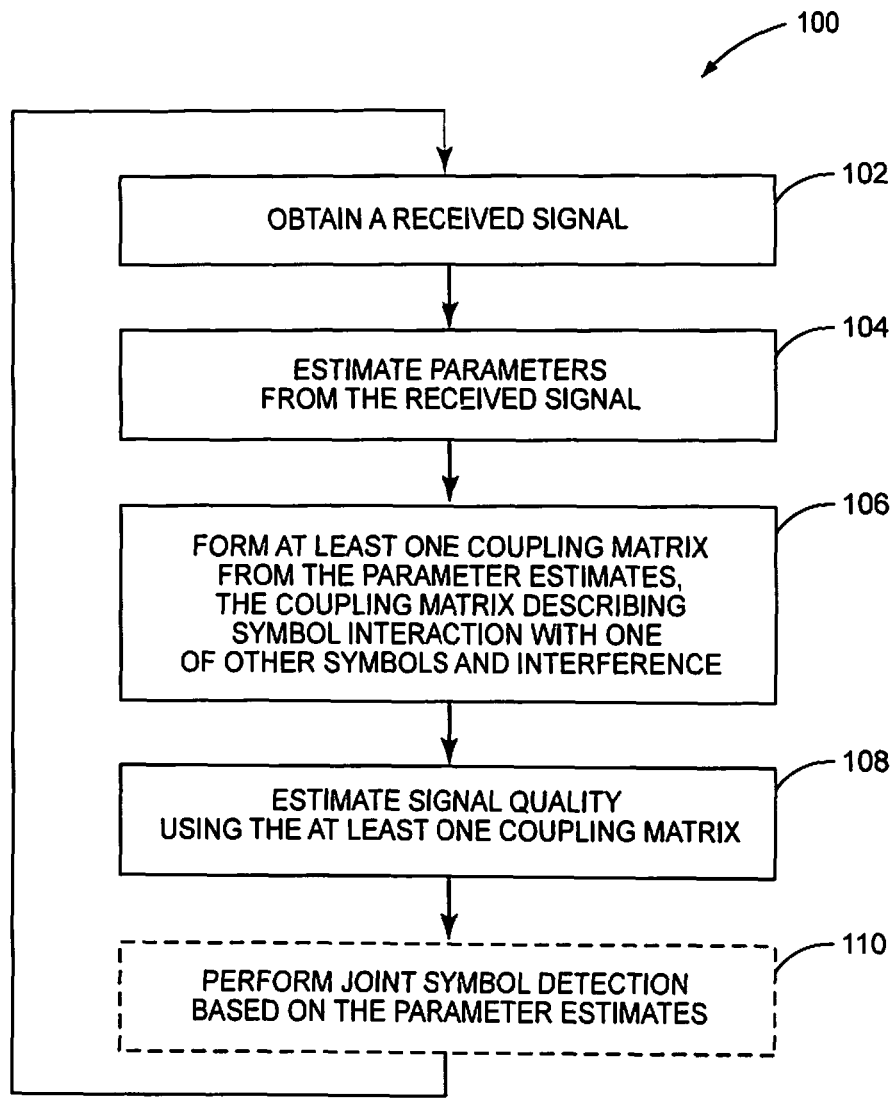
FIG. 4 is a flow diagram of a method of estimating the signal quality of a received signal in the receiver of FIG. 2.

FIG. 4 depicts a method 100 of estimating the signal quality of a received signal 33 in a receiver 38. A signal is obtained from one or more antennas 36 (block 102). Parameter estimates, such as the response matrix H and covariance R of the signal impairment, are generated from the received signal (block 104). A coupling matrix G or Q is formed based on the parameter estimates (block 106). The signal quality, such as an SINR measure, is then estimated from the coupling matrix (block 108). The signal quality may for example comprise the minimum eigenvalue of Q (or a scaled minimum eigenvalue of G). In some embodiments, joint symbol detection may also be performed, also based on the parameter estimates. The method 100 is repeated per block of K symbols, depending on the operative signal protocol (e.g., CDMA, OFDM, or the like).

Figure 5:
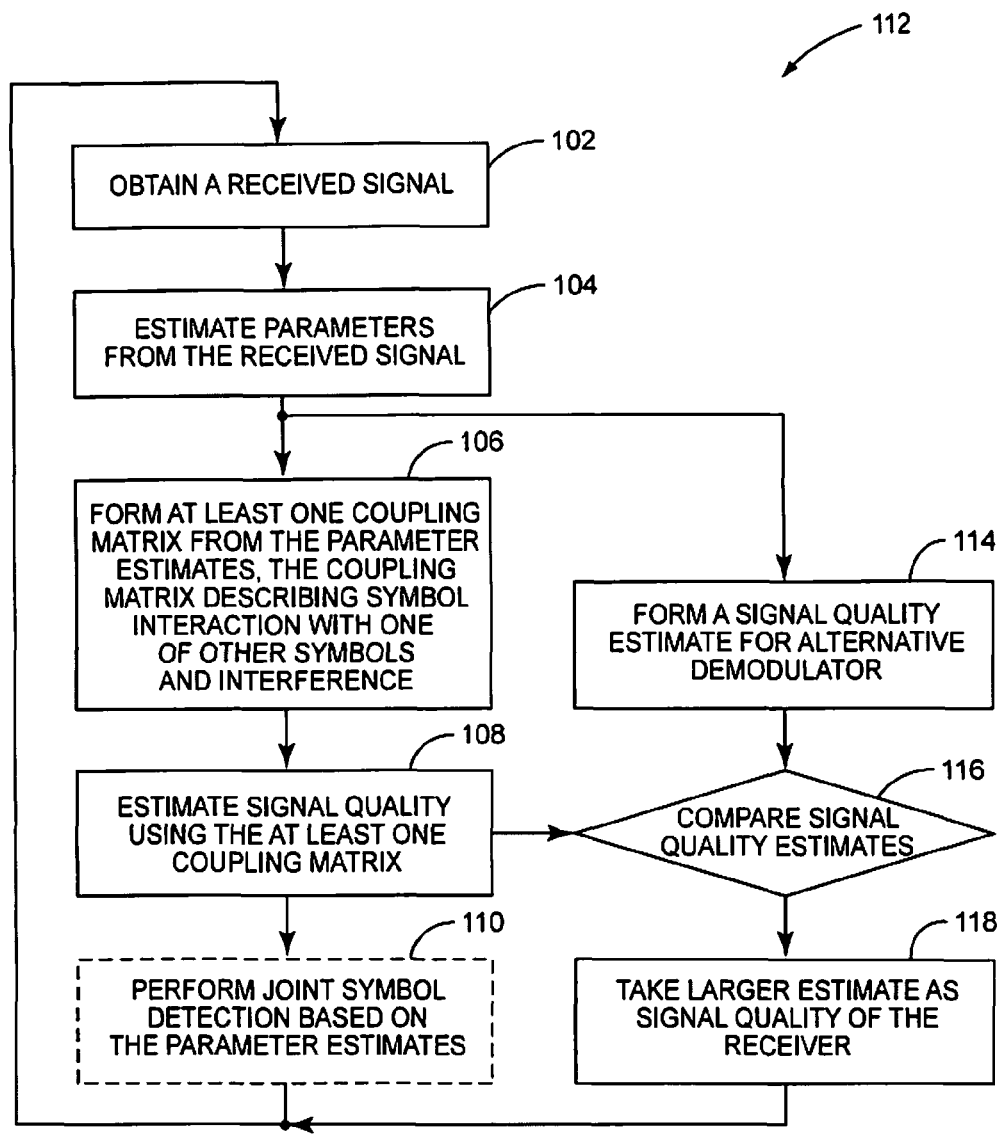
FIG. 5 is a flow diagram of a method of estimating signal quality by comparing the signal quality estimate obtained by the method of FIG. 4 with a signal quality estimate for an alternative demodulator.

The method 100 depicted in FIG. 4 can yield pessimistic estimates of signal quality. In one embodiment, the estimated signal quality is compared to a bound, and the bound is selected when it is higher. This method 112 is described with reference to FIG. 5, where additional steps include forming a signal quality estimate for an alternative demodulator (block 114), and comparing the two signal quality estimates (block 116). In one embodiment, the bound is the SINR estimate of another demodulator, such as a linear demodulator or nonlinear demodulator with single symbol detection (SSD). The larger value of signal quality is then taken as the effective signal quality of the receiver 38 (block 118). In other embodiments, the estimated signal quality may be scaled to remove the negative bias inherent in the method 100.

For example, a feedforward filter for a block decision feedback estimator (BDFE) with SSD may be used to generate an alternate SINR estimate using standard approaches (block 114). A feedforward filter for a BDFE with joint detection (such as one that is actually used to demodulate the data) can then be used to determine a second SINR estimate using the minimum eigenvalue approach or one of the approaches that may be biased (block 108). These values are compared (block 116), and the final SINR estimate is taken as the maximum of these two values (block 118).

The methods 100 and 112 described above yield accurate signal quality estimates with moderate complexity. In other embodiments, simpler functions of Q may be used to reduce computational complexity, at the risk of loss of accuracy. In theory, the determinant of Q, denoted 101, is the product of all eigenvalues. For a K×K matrix Q, the Kth root of the determinant gives a geometric average of the eigenvalues. Geometric averages tend to be dominated by the smallest element, so the result is close to the minimum eigenvalue. Thus, another estimate is $$SINR_{est} = \sqrt[K]{|Q|} \quad (7)$$

which can be computed in the log domain as $$SINR_{est}(dB) = 10 \log(|Q|)/K \quad (8)$$

In one embodiment, for the special case of a 2×2 matrix, a closed form expression for the eigenvalues can be obtained. The determinant gives the product of the two eigenvalues and the trace gives the sum of the two eigenvalues. These two equations can be used to solve for the eigenvalues as a function of the elements in Q. This gives $$SINR_{est} = \lambda_{min}(Q) = 0.5(T - \sqrt{T^2 - 4D}) \quad (9)$$

where T denotes the trace of Q and D denotes the determinant of Q. While the expression in equation (9) is the minimum eigenvalue for the 2×2 case, it can still be used as a form of SINR estimation for larger matrices. Thus, the SINR estimate is a function of the trace and determinant of the Q matrix.

In another embodiment, the geometric and arithmetic averages of the eigenvalues are used to form a quality measure. Since the determinant is the product of the eigenvalues, a geometric average can be obtained using $$a_G = \sqrt[K]{|Q|} \quad (10)$$

Since the trace is the sum of the eigenvalues, an arithmetic average can be obtained using $$a_A = \text{trace}(Q)/K \quad (11)$$

These two averages will be the same and equal to the minimum eigenvalue when all eigenvalues are the same. Otherwise, the arithmetic average will be larger. The difference or ratio of these two averages would give an indication of the accuracy of equation (6). For example, the following ratio may be formed:

$$r = a_G/a_A \quad (12)$$

which is between 0 and 1. If it is close to 1, then the geometric mean (or arithmetic mean) is close to the minimum eigenvalue. If the ratio is close to 0, then the geometric mean will be larger than the minimum eigenvalue, indicating that the estimator in equations (7) or (8) may be biased high. Such a bias could be corrected using r. For example, equation (8) could be replaced with $$SINR_{est}(dB) = 10 \log(|Q|)/K - (1-r)C \quad (13)$$

where C is a correction factor, the value of which may be determined based on simulation. The correction factor may be a function of signal and noise levels, as well as the dispersiveness of the channel.

Correction may not be necessary, as the minimum eigenvalue may not entirely dominate performance if most of the other eigenvalues are much larger. In such situations, C may be a negative value, such that the estimated SINR from equation (8) is increased when using equation (13).

A known technique for estimating quantities for which there is no closed form expression is Monte Carlo simulation, as described by A. Doucet and X. Wang, "Monte Carlo Methods for Signal Processing [A review in the statistical signal processing context]," IEEE Sig. Proc. Mag., November 2005, the disclosure of which is incorporated herein by reference in its entirety. A Monte Carlo simulation may be used to estimate an effective SINR using the Q matrix. In one embodiment, using equation (1), z values are randomly generated, by randomly generating symbol vectors s, scaling them by an estimate of H, and adding a randomly generated realization of u. Joint detection may then be applied to form an estimate of s. The estimate is compared to the generated value to determine how many symbols or bits were in error. This process is then repeated, so that an accurate error rate can be measured. Then, using equation (5) or a similar, modulation-dependent expression, an effective SINR can be determined. In one embodiment, equation (5) is used to generate a table of SINR and BER values. Using interpolation, an effective SINR is obtained from the measured BER and the table. While this approach is fairly involved, its accuracy improves without limit as the number of realizations used to measure error rate increases.

For HSPA, H is a function of the channel estimates (which change slowly) and the longcode scrambling (which changes rapidly). In one embodiment, random realizations of the longcode scrambling are included, giving random realizations of H as well. The results are also averaged over scrambling code realizations.

Figure 6:
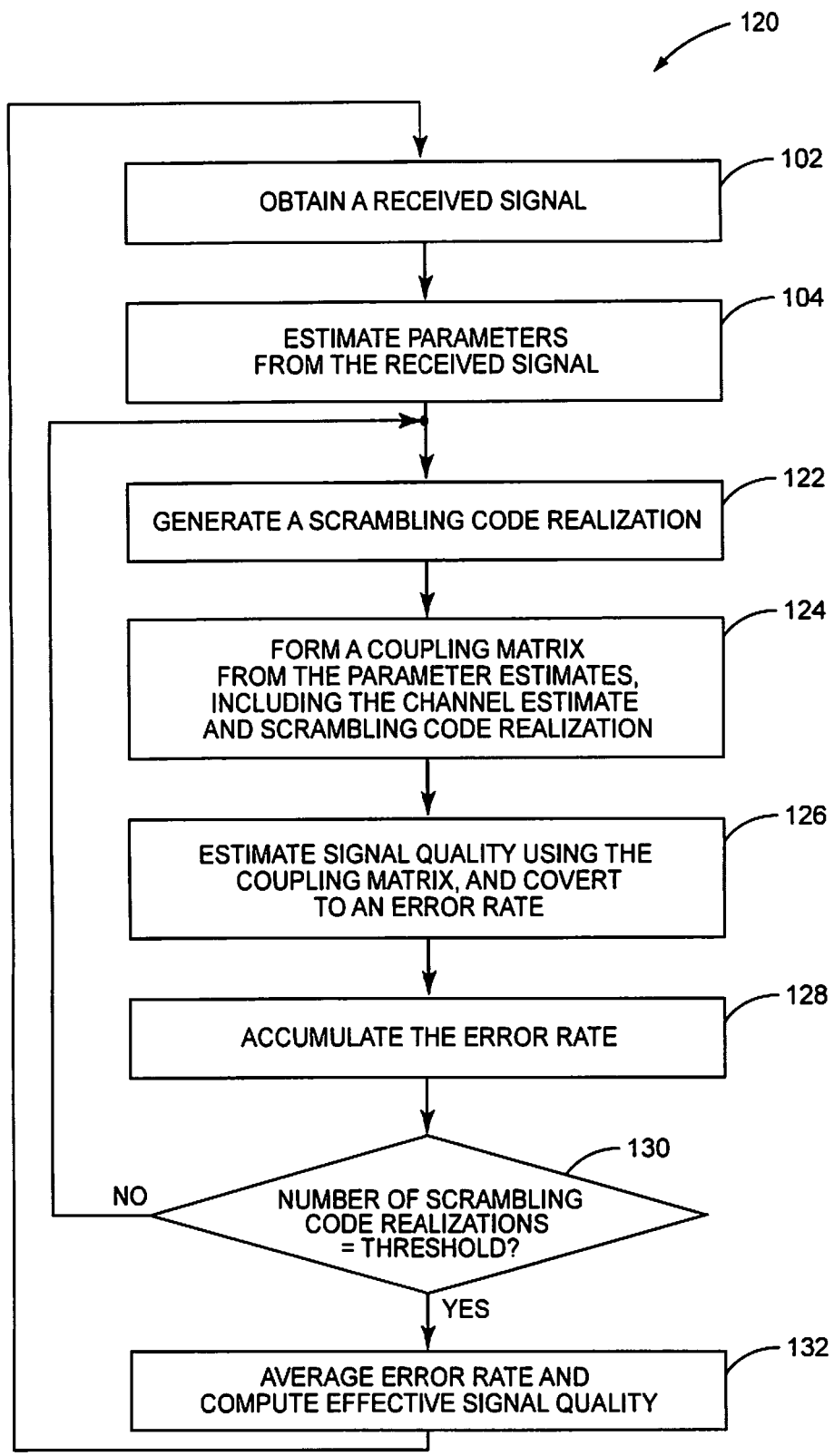
FIG. 6 is a flow diagram of a Monte Carlo method of estimating signal quality using a number of scrambling code realizations.

FIG. 6 depicts a method 120 of estimating signal quality of a received signal 33 in a wireless communications receiver 38, using a modified Monte Carlo simulation approach, in which the amount of random realizations for HSPA is reduced by only generating realizations of H or Q. A signal is obtained from one or more antennas 36 (block 102). Parameter estimates, such as the channel response portion of the matrix H, and covariance R of the signal impairment u, are generated from the received signal (block 104). Within a loop, a random scrambling code realization is generated (block 122), and a coupling matrix Q is formed based on the parameter estimates, including the channel estimates and scrambling code realization together in the matrix H (block 124). The SINR is determined for each realization using one of the techniques described herein, and the SINR is converted to an error rate using equation (5) or something similar (block 126). The error rate is accumulated to be averaged over multiple iterations (block 128). When a sufficient number of scrambling code realizations have been generated and corresponding error rates calculated (block 130), the accumulated error rates are averaged over the number of iterations, and then converted to an effective SINR (block 132).

In one embodiment, the random generation is performed "on the fly," using a random number generator. In another embodiment, random numbers are generated off-line and stored in a table in memory in the receiver 38. In still another embodiment, the two approaches are mixed, accessing a table of random values, using a randomly generated index.

For HSPA, where there are many H or Q matrices to average over, embodiments described herein can use a representative H or Q matrix instead. For many applications, a simple average value is not so useful, as the off-diagonal elements typically average to zero, indicating that joint detection is not needed. This is overly optimistic. In one embodiment an RMS value is calculated for each term in the matrix, with good results. RMS values can be obtained by deriving formulas for the elements, taking the magnitude square, taking the expected value, and then taking the square root. In another embodiment an average magnitude value is calculated for each term in the matrix. In this case, it is simpler to average the magnitude of the real and imaginary components, separately to avoid a square-root operation.

A detailed example is presented for a Block Linear Equalizer (BLE) comprising a Block Decision-Feedback Equalizer (BDFE) with joint detection, as described in the above-cited, co-pending U.S. patent application Ser. No. 12/035,846, "Method and Apparatus for Block-Based Signal Demodulation," considering the general case of a time-varying, chip-level forward filter (the time-invariant FF is a special case). The vector (antenna signals stacked) of chip samples at time $t=n_0 T_c + d_j T_s$ can be expressed as filtering the received signal vector $r(t)$ to a filter matched to the chip pulse shape $p(t)$, giving chip samples $$v_j(n_0) = \int r(t) p^*(t - n_0 T_C - d_j T_s) dt \quad (14)$$

where $r(t)$ is the baseband-equivalent received signal, $d_j$ is a processing delay (e.g., FF tap location), $T_c$ is the chip period, and $T_s$ is the sample period.

First, chip estimates are obtained using $$e(n_0) = \sum_j w_j^H(n_0) v_j(n_0) \quad (15)$$

where $w_j(n_0)$ is a subvector of combining weights corresponding to the jth tap location that vary with chip period $n_0$.

These chip estimates are then despread for different codes $k_0$ giving initial detection statistics $$z_{k_0} = \sum_{n_0=0}^{N-1} c_{k_0,0}^*(n_0) e(n_0) \quad (16)$$

where $c_{k,j}(n)$ is a spreading code chip value corresponding to multicode k, symbol period j, and chip period n.

These initial statistics, collected into a vector z, can be modeled as in equation (1). A maximum likelihood joint detection metric associated with symbol hypothesis s=a is given by equation (2), which can be simplified to the form in equation (3). Thus, expressions for H and R are needed to obtain an expression for G.

From equation (1), H relates the elements in z to the symbol s. An element in H is $$H(k_1, k_2) = \sqrt{E_c} \sum_{n_0=0}^{N-1} c_{k_1,0}^*(n_0) \quad (17)$$

$$\sum_{n=0}^{N-1} c_{k_2,0}(n) \sum_j w_j^H(n_0) \sum_{l=0}^{L-1} g_l R_p(d_j T_s + (n_0 - n)T_c - \tau_l)$$

where $R_p(t)$ is the pulse shape autocorrelation function (or convolution of transmit and receive filters) and the radio channel response has been modeled as L taps with delays $\tau_l$ and coefficients $g_l$. The summations over n and $n_0$ can be interpreted as a summation over the rows and columns of a matrix.

By summing along diagonals (index m) instead, one obtains the alternative expression:

$$H(k_1, k_2) = \sqrt{E_c} \sum_{m=1-N}^{N-1} \sum_{n=A(m)}^{B(m)} c_{k_1,0}^*(n+m) \quad (18)$$

$$c_{k_2,0}(n) \sum_j w_j^H(n+m) \sum_{l=0}^{L-1} g_l R_p(d_j T_s + mT_c - \tau_l)$$

where $A(m) = -m$ and $B(m) = N-1$ when m is negative, and $A(m) = 0$ and $B(m) = N-1-m$ when m is positive.

In one embodiment, in which time varying weights are used, $$G \approx H \text{ and} \quad (19)$$

$$Q \approx \sqrt{E_c} H. \quad (20)$$

In one embodiment, in which time-invariant weights are used, $$w_j(n_0) = w_j \quad (21)$$

and equation (18) simplifies to:

$$H(k_1, k_2) = \sqrt{E_c} \sum_{m=1-N}^{N-1} C(k_1, k_2, m) \sum_j w_j^H \sum_{l=0}^{L-1} g_l R_p(d_j T_s + mT_c - \tau_l) \quad (22)$$

where $$C(k_1, k_2, m) = \sum_{n=A(m)}^{B(m)} c^*_{k_1,0}(n+m) c_{k_2,0}(n) \quad (23)$$

is an aperiodic code cross-correlation function.

With code averaging, R is proportional to an identity matrix, so that $$Q = G = (1/X) H^H H \quad (24)$$

where $$X = w^H R_v w \quad (25)$$

and $R_v$ is an impairment covariance matrix associated with the design of w. Specifically, for an ML design, $$w = R_v^{-1} h \quad (26)$$

where h is a channel response vector. Equations (18) and (22) may be expressed in terms of net channel response vectors, as was done in co-pending U.S. patent application Ser. No. 12/133,636, titled "Method and Apparatus for Efficient Estimation of Interference in a Wireless Receiver," by Cairns, et al., filed Jun. 5, 2008, assigned to the assignee of the present application, and incorporated by reference herein in its entirety.

Equations (19) or (24) yield expressions for the Q matrix as a function of the random scrambling mask and Walsh spreading codes. To form a representative value, a different scrambling mask subsequences are considered, to obtain different Q matrices for forming an RMS value.

In one embodiment, an exhaustive list of possible matrices is considered. As one non-limiting example, for a block of 4 chips and QPSK scrambling, there are $4^4 = 256$ possible scrambling sequences. For the representative matrices proposed, a common phase rotation does not change the result. Accordingly, one of the chip values can be fixed, giving only 64 possible sequences. These 64 sequences can be used to generate 64 Q matrices, allowing an RMS or absolute value matrix to be determined. In one embodiment, instead of an exhaustive list, a representative subset is used.

In another embodiment, a representative Q matrix is obtained by using Q matrices generated from a particular scrambling sequence. As a non-limiting example, an HSPA uplink slot consists of 640 blocks of 4 chips. In one embodiment, if a slot is being demodulated anyway, the G matrices generated for that slot are used to obtain a representative Q matrix. If there is no slot to demodulate, the receiver may emulate demodulating a slot.

In one embodiment, for the case of MIMO and GRake with joint detection, only symbols using the same spreading code are jointly detected. In this case, a simple average Q matrix can be used as the representative matrix, since the averaging does not remove the need for joint detection. Note that averaging is over the pseudo-random scrambling, not the fading channel coefficients.

In general, the matrix Q used in joint detection is proportional to G. Thus, additional scaling may be needed to convert G into an SINR matrix. Such scaling gives diagonal elements that are SINR values for the case when the off-diagonal elements are zero.

For example, suppose the channel is estimated using pilot symbols or a pilot channel with symbol energy Ep or amplitude $Ap = \sqrt{Ep}$. Channel estimates typically include the symbol amplitude as part of the channel estimate, so that in equation (17), $\sqrt{E_c}$ is omitted, the values for g include a factor Ap, and a division by N is included. To obtain an SINR estimate of the pilot, no further scaling is needed in equation (24). However, to obtain an SINR estimate of the traffic channel, the result in equation (24) would need to be scaled by the traffic-to-pilot power ratio. This ratio can be obtained using known techniques for estimating code powers. In WCDMA uplink, the traffic-to-pilot power ratio can be known by detecting the transport format.

Figure 7:
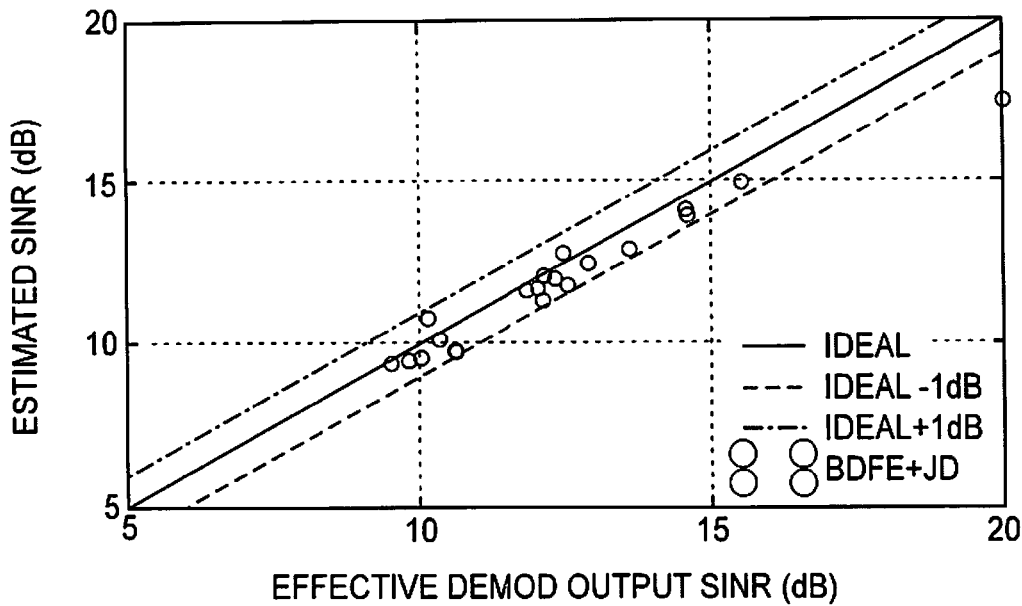
FIG. 7 is a plot of the estimated signal quality vs. effective signal quality for the method of FIG. 4.
Figure 8:
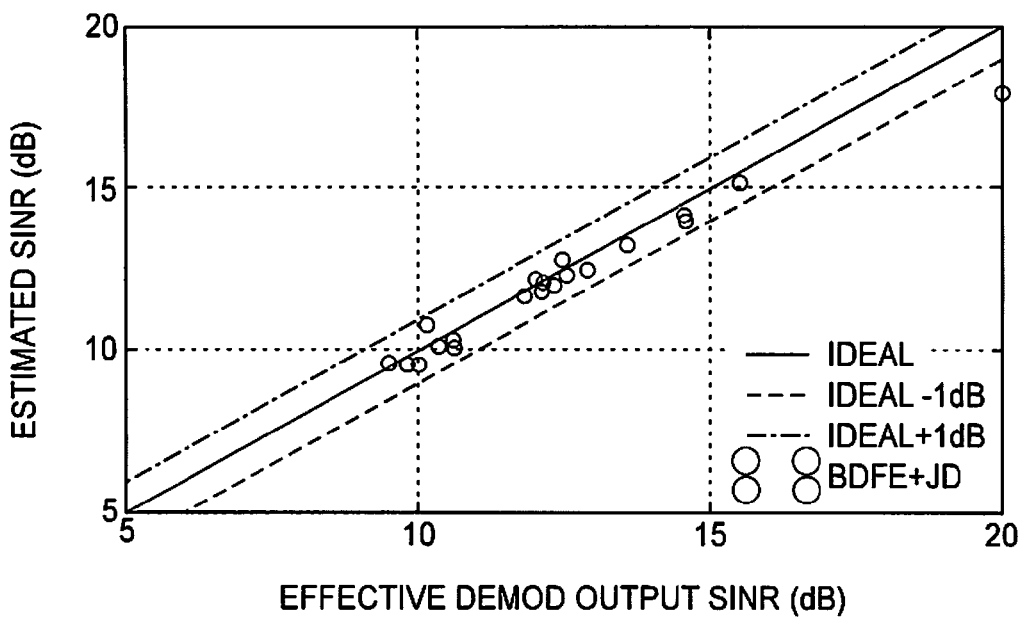
FIG. 8 is a plot of the estimated signal quality vs. effective signal quality for the method of FIG. 5.

The minimum eigenvalue approach to estimating signal quality from a coupling matrix according to the method 100, was simulated for the case of HSPA uplink, 16-QAM, and the use of an RMS coupling matrix. The estimated SINR was compared to an effective SINR obtained by a Monte Carlo approach. For each fading channel realization, a representative Q matrix (RMS values) was formed, and the minimum eigenvalue was extracted. FIG. 7 depicts a scatter plot of estimated vs. effective (correct) SINR, where each point is a different fading realization. Note that most estimates are within 1 dB of the effective value. FIG. 8 depicts a similar plot, for the method 112 of comparison to a signal quality estimate for an alternative demodulator, and taking the maximum signal quality estimate. Note that the results are less pessimistic than those depicted in FIG. 7.

While the invention has been described in the context of a CDMA system, the invention is not limited to such systems. The invention is applicable to any joint detection or maximum likelihood (ML) receiver. This includes ML detection of MIMO OFDM symbols in the LTE downlink, ML detection of TDM symbols in the LTE uplink, and ML detection of TDM and CDM symbols in the HSPA uplink.

Referring to FIG. 2, those of skill in the art will readily appreciate that the receiver 38 comprises one or more processing circuits 40, 42, 44 that can be implemented in hardware, software, or any combination thereof. In particular, the baseband processor 42, or its constituent modules 46, 48, 50, 52, as depicted in FIG. 3, may be implemented in hardware, software, or any combination thereof. In one embodiment, the baseband processor 42 is implemented at least partially in a digital signal processor (DSP) or other microprocessor-based circuit executing computer program instructions stored in a memory device included in or associated with the baseband processor 42. In another embodiment, at least a portion of the baseband processor 42 is implemented in hardware, which may include digital processing elements within a Field Programmable Logic Array (FPLA) or Application Specific Integrated Circuit (ASIC).

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of estimating the signal quality of a received signal in a wireless communication receiver, comprising:
   obtaining the received signal;
   estimating one or more parameters from the received signal;
   forming at least one coupling matrix from the parameter estimates, the coupling matrix describing symbol interaction with one or more other symbols and interference; and estimating signal quality using the at least one coupling matrix, wherein the signal quality comprises a geometric average of eigenvalues of the coupling matrix.

2. The method of claim 1 wherein the geometric average of the eigenvalues of the coupling matrix comprises, for a K×K matrix, the Kth root of the determinant of the matrix.

3. A method of estimating the signal quality of a received signal in a wireless communication receiver, comprising:
  obtaining the received signal; estimating one or more parameters from the received signal;
  forming at least one coupling matrix from the parameter estimates, the coupling matrix describing symbol interaction with one for more other symbols and interference; and
  estimating signal quality using the at least one coupling matrix, wherein the signal quality is a function of a trace and determinant of the coupling matrix.

4. A method of estimating the signal quality of a received signal in a wireless communication receiver, comprising:
  obtaining the received signal;
  estimating one or more parameters from the received signal;
  forming at least one coupling matrix from the parameter estimates, the coupling matrix describing symbol interaction with one or more other symbols and interference; and
  estimating signal quality using the at least one coupling matrix, wherein the signal quality comprises a ratio of a geometric average of eigenvalues of the coupling matrix to an arithmetic averages of the eigenvalues.

5. The method of claim 4, further comprising applying a correction factor in estimating the signal quality if the ratio of geometric to arithmetic averages of eigenvalues is close to zero.

6. A method of estimating the signal quality of a received signal in a wireless communication receiver, comprising:
  obtaining the received signal; estimating one or more parameters from the received signal;
  forming at least one coupling matrix from the parameter estimates, the coupling matrix describing symbol interaction with one or more other symbols and interference; and estimating signal quality using the at least one coupling matrix, wherein:
  forming at least one coupling matrix from the parameter estimates comprises, for each of a plurality of iterations, randomly generating a scrambling code realization; combining the scrambling code realization with the parameter estimates;
  forming a coupling matrix based on the parameter estimates that include the scrambling code realization;
  forming an iterative signal quality estimate using the coupling matrix based on the scrambling code realization;
  converting the iterative signal quality estimate to an error rate; and accumulating the error rate; and estimating signal quality using the at least one coupling matrix comprises converting the accumulated error rate to an overall signal quality estimate.

7. The method of claim 6 wherein randomly generating a scrambling code realization comprises generating a scrambling code realization based on the output of a random number generator.

8. The method of claim 6 wherein randomly generating a scrambling code realization comprises generating a scrambling code realization based on a stored table of random values.

9. The method of claim 8 wherein randomly generating a scrambling code realization comprises generating a dynamic random value, and indexing the stored table using the dynamic random value.

10. A receiver configured in a wireless communication network, comprising:
  a radio front end configured to receive a communication signal comprising a plurality of symbols, and down-convert the received signal to baseband;
  a baseband processor configured to receive the baseband signal from the radio front end;
  a parameter estimator configured to
    estimate one or more parameters from the baseband signal; and
    form at least one coupling matrix from the parameter estimates, the coupling matrix describing symbol interaction with one of other symbols and interference; and
  a signal quality estimator configured to estimate signal quality using the at least one coupling matrix wherein the signal quality comprises a geometric average of eigenvalues of the coupling matrix.

11. A receiver configured in a wireless communication network, comprising:
  a radio front end configured to receive a communication signal comprising a plurality of symbols, and down-convert the received signal to baseband;
  a baseband processor configured to receive the baseband signal from the radio front end;
  a parameter estimator configured to
    estimate one or more parameters from the baseband signal; and
    form at least one coupling matrix from the parameter estimates, the coupling matrix describing symbol interaction with one of other symbols and interference; and
  a signal quality estimator configured to estimate signal quality using the at least one coupling matrix wherein the signal quality is a function of a trace and determinant of the coupling matrix.

12. A receiver configured in a wireless communication network, comprising:
  a radio front end configured to receive a communication signal comprising a plurality of symbols, and down-convert the received signal to baseband;
  a baseband processor configured to receive the baseband signal from the radio front end;
  a parameter estimator configured to
    estimate one or more parameters from the baseband signal; and
    form at least one coupling matrix from the parameter estimates, the coupling matrix describing symbol interaction with one of other symbols and interference; and
  a signal quality estimator configured to estimate signal quality using the at least one coupling matrix wherein the signal quality comprises a ratio of a geometric average of eigenvalues of the coupling matrix to an arithmetic averages of the eigenvalues.

* * * * *